United States Patent
Li et al.

(10) Patent No.: US 8,408,181 B2
(45) Date of Patent: Apr. 2, 2013

(54) THROTTLE CONTROL MODULE

(75) Inventors: Yong Bin Li, Hong Kong (CN); Rui Feng Qin, Hong Kong (CN); Ning Sun, Shenzhen (CN); Chao Wen, Shenzhen (CN); Yuk Wai Elton Yeung, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 504 days.

(21) Appl. No.: 12/708,971

(22) Filed: Feb. 19, 2010

(65) Prior Publication Data
US 2010/0212628 A1 Aug. 26, 2010

(30) Foreign Application Priority Data

Feb. 20, 2009 (CN) .......................... 2009 1 0105491

(51) Int. Cl.
*F02D 41/00* (2006.01)
(52) U.S. Cl. ..................... 123/339.14; 123/337; 701/102
(58) Field of Classification Search ............. 123/339.14, 123/339.23, 339.26, 336, 337, 361, 367, 123/376, 403
See application file for complete search history.

(56) References Cited

U.S. PATENT DOCUMENTS

| | | | |
|---|---|---|---|
| 5,074,267 A | 12/1991 | Ironside et al. | |
| 5,828,193 A * | 10/1998 | Furuta | 318/400.08 |
| 6,067,958 A | 5/2000 | Kamimura et al. | |
| 6,144,125 A * | 11/2000 | Birkestrand et al. | 310/68 B |
| 6,253,733 B1 * | 7/2001 | Marumoto et al. | 123/399 |
| 6,341,593 B2 | 1/2002 | Kamimura et al. | |
| 6,345,603 B1 * | 2/2002 | Abboud et al. | 123/397 |
| 6,347,613 B1 | 2/2002 | Rauch | |
| 6,918,373 B1 * | 7/2005 | Wilker | 123/361 |
| 7,549,407 B2 * | 6/2009 | Krupadanam | 123/399 |
| 7,762,231 B2 * | 7/2010 | Dugas et al. | 123/399 |
| 2004/0244771 A1 * | 12/2004 | Hoshino et al. | 123/350 |
| 2005/0224048 A1 * | 10/2005 | Hoshino et al. | 123/396 |
| 2006/0016427 A1 | 1/2006 | Uda et al. | |
| 2006/0090731 A1 * | 5/2006 | Hoshino et al. | 123/399 |
| 2008/0110435 A1 * | 5/2008 | Baasch et al. | 123/399 |
| 2008/0110436 A1 * | 5/2008 | Baasch et al. | 123/399 |
| 2008/0242459 A1 * | 10/2008 | Ishioka | 474/70 |

\* cited by examiner

*Primary Examiner* — John T. Kwon
*Assistant Examiner* — Johnny Hoang
(74) *Attorney, Agent, or Firm* — Muncy, Geissler, Olds & Lowe, PLLC

(57) ABSTRACT

A throttle control module for controlling a throttle, comprises: a BLDC motor; a gear train connecting the motor to the throttle; and a throttle position sensor. A PWM module is connected to the throttle position sensor and generates a pulse-width modulation sequence according to the signal from the throttle position sensor and a desired throttle position signal. A decoder module generates commutation logic for the motor based on the signal from the throttle position sensor. A motor controller controls commutation of the motor according to the pulse-width modulation sequence and the commutation logic.

6 Claims, 4 Drawing Sheets

THROTTLE CONTROL MODULE

CROSS REFERENCE TO RELATED APPLICATIONS

This non-provisional patent application claims priority under 35 U.S.C. §119(a) from Patent Application No. 200910105491.5 filed in The People's Republic of China on Feb. 20, 2009.

FIELD OF THE INVENTION

This invention relates to a module and method for controlling a throttle, and in particular to a method and a throttle control module for controlling a throttle of an internal combustion engine.

BACKGROUND OF THE INVENTION

In an internal combustion engine, a throttle is a valve that directly regulates the amount of air entering the engine, indirectly controlling the fuel burned in each cycle due to the fuel-injector or carburetor maintaining a relatively constant fuel/air ratio. Generally a throttle is a type of quarter-turn butterfly valve which has a rotatable rod passing through it. The throttle rotates with the rod through a predetermined angle, such as 90 degrees, with 0 degree rotation corresponding to the completely closed state and 90 degree rotation corresponding to fully open state.

FIG. 6 illustrates a throttle control module 20 which comprises throttle position sensors (TPS) 21, pulse-width modulation (PWM) module 22, motor controller 23, brush type permanent magnet direct current (PMDC) motor 24 and a gear train 25. The sensor 21 detects the position of the throttle and generates a throttle position signal. The PWM module 22 generates a PWM sequence according to the throttle position signal and a desired position signal provided by an engine control module (ECM). As is known, an ECM, also known as engine control unit (ECU) or power-train control module (PCM), is a type of electronic control unit that determines the amount of fuel, ignition timing and other parameters an internal combustion engine needs to keep running. The motor controller 23 controls the PMDC motor 24 according to the PWM sequence so that the PMDC motor 24 as well as the gear train 25 can control the opening or position of the throttle 10. As is known, the throttle rotates repeatedly within a predetermined angle such that only some of the commutator segments will frequently make sliding contact with the brushes. These segments as well as the PMDC motor will probably have a shortened life. In addition, an oxide film will build up on the copper segments which results in an increased resistance and an increased temperature. Furthermore, there is the risk of building up thin layers of carbon creating dead spots on the commutator segments especially on motors where the operating mode only sees interface contacts between brush and commutator of 2 or 3 segments in connection with high frequent position.

One proposed solution is to replace the motor with a brushless direct current (BLDC) motor. FIG. 7 illustrates a known throttle control module 30 for a BLDC motor 34 which is partly shown in FIG. 8. The motor 34 is shown partially exploded to reveal a rotor having a permanent magnet rotor core 34a and a sensor magnet 39, a wound stator 34b and a circuit board 38 supporting three Hall sensors 37. The Hall sensors provide signals indicative of the rotational orientation of the rotor based on the interaction of the Hall sensors and the sensor magnet 39. The throttle control module 30 comprises TPS 31, PWM module 32, motor controller 33, BLDC motor 34, gear train 35 and commutation logic module 36. The commutation logic module 36 generates commutation logic according to signals from Hall sensors 37 which are mounted inside the BLDC motor 34. The motor controller 33 controls commutation of the BLDC motor 34 according to the commutation logic and PWM sequence provided by the PWM module 32, so that the opening of the throttle 10 is controlled. For this proposal, the signals from the Hall sensors are critical. However, the ambient temperature where the BLDC motor 34 operates is often high and sometimes exceeds the normal operating temperature for the Hall sensors. Thus the Hall sensors and the throttle control module are not reliable. Furthermore, the throttle control module is costly as three Hall sensors 37 are required for the BLDC motor.

SUMMARY OF THE INVENTION

Hence there is a desire for a reliable and low-cost throttle control module using a BLDC motor.

This is achieved in the present invention by using a BLDC motor which has no Hall sensors.

Accordingly, in one aspect thereof, the present invention provides a throttle control module for controlling the opening of a throttle, comprising: a brushless direct current motor for moving the throttle, the motor having a permanent magnet rotor having a number of pole pairs; a gear train having a reduction coefficient and connecting the motor to the throttle; a throttle position sensor generating a throttle position signal indicative of the position of the throttle; a pulse-width modulation module connected to the throttle position sensor, generating a pulse-width modulation sequence according to the throttle position signal from the throttle position sensor and a desired throttle position signal; a decoder module connected to the throttle position sensor, performing decoding calculation on the throttle position signal from the throttle position sensor to generate commutation logic for the brushless direct current motor; and a motor controller connected to the pulse-width modulation module and the decoder module, to control commutation of the brushless direct current motor according to the pulse-width modulation sequence and the commutation logic.

Preferably, the decoder module comprises: an analog-digital converter for converting the throttle position signal from the throttle position sensor into a digital throttle position signal and calibrating the digital throttle position signal; and a decoding calculation unit for performing decoding calculation based on the calibrated digital throttle position signal, the conversion precision of the analog-digital converter, the number of pole pairs of the rotor and the reduction coefficient of the gear train to get an electrical angle corresponding to the current position of the throttle, and generating the commutation logic according to the electric angle.

Preferably, the gear train comprises: a driving gear fixed on an output shaft of the brushless direct current motor; a driven gear fixed on an input shaft of the throttle, the radius of the driven gear being larger than the radius of the driving gear; and a transmission gear disposed between and in mesh with the driving gear and the driven gear.

Preferably, the transmission gear is a dual gear comprising a larger gear and a smaller gear coaxially disposed, the larger gear being in mesh with the driving gear and the smaller gear being in mesh with the driven gear.

Preferably, the decoder module calculates the electrical angle according to the equation:

$$G = Rem\left[\left(\frac{X}{2^n} * RANG * m * P\right)/360\right],$$

wherein, Rem [ ] represents a function to take the reminder, X represents the calibrated digital throttle position signal, n represents the precision bits of the analog-digital converter, RANG represents the maximum angle that the throttle can rotate, m represents the reduction coefficient of the gear train, and P represents the number of pole pairs of the rotor.

Preferably, the brushless direct current motor is a Hall sensor-less motor.

According to a second aspect, the present invention provides a method of controlling a throttle comprising the steps of: providing a brushless direct current motor connected to the throttle by a reduction gear train, the motor having a permanent magnet rotor having a number of pole pairs; receiving a throttle position signal from a throttle position sensor; converting the throttle position signal into a digital throttle position signal; calibrating the digital throttle position signal; generating commutation logic for the brushless direct current motor by performing decoding calculation on the calibrated digital position signal; generating a pulse-width modulation sequence according the calibrated digital position signal and a desired throttle position signal; and controlling commutation of the motor according to the pulse-width modulation sequence and the commutation logic to control the opening of the throttle.

Preferably, the gear train is provided with a driving gear fixed on an output shaft of the brushless direct current motor, a driven gear fixed on an input shaft of the throttle, and a dual tier transmission gear in mesh with the driving gear and the driven gear, the radius of the driven gear being larger than radius of the driving gear.

Preferably, the steps of generating the commutation logic for the brushless direct current motor comprises: generating an electric angle corresponding to the current opening position of the throttle by means of performing decoding calculation on the calibrated digital throttle position signal, the number of precision bits of the analog-digital converter, and the number of pole pairs of the rotor; and generating the commutation logic by means of performing decoding calculation on the electrical angle.

Preferably, the electrical angle G is generated according to the equation:

$$G = Rem\left[\left(\frac{X}{2^n} * RANG * m * P\right)/360\right],$$

wherein, Rem[ ] represents a function to take the remainder, X represents the calibrated digital throttle position signal, n represents the precision bits of the analog-digital converter, RANG represents the maximum angle that the throttle can rotate, m represents the reduction coefficient of the gear train, and P represents the number of pole pairs of the rotor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
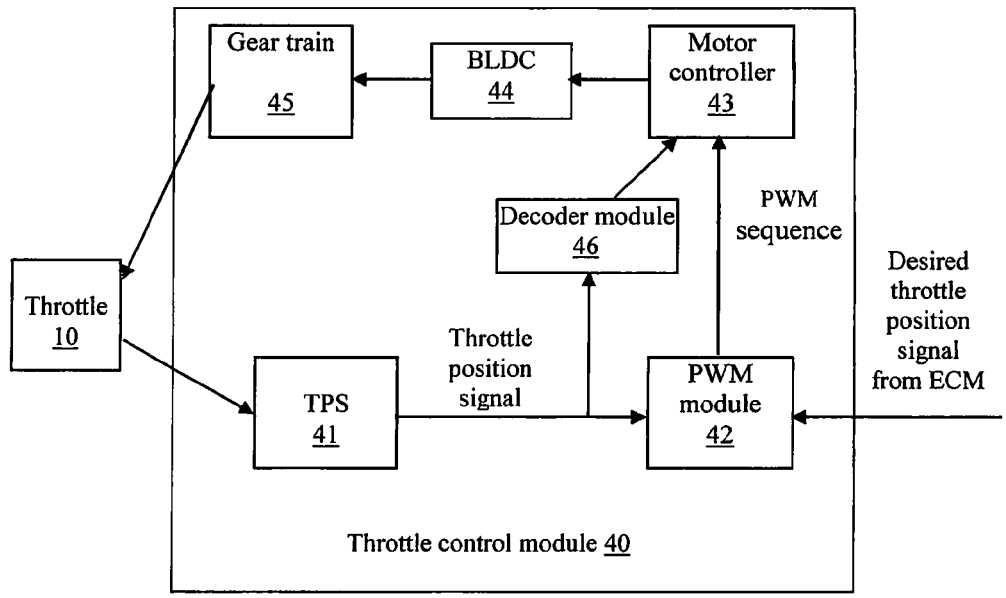
FIG. 1 is a block diagram illustrating a throttle control module according to a preferred embodiment of the present invention.

FIG. 1 illustrates a throttle control module according to the preferred embodiment of the present invention. The throttle control module 40 comprises throttle position sensors (TPS) 41, pulse-width modulation (PWM) module 42, decoder module 46, motor controller 43, BLDC motor 44 and gear train 45. The TPS 41 measures the position or orientation of the butterfly valve of the throttle 10 and generates a throttle position signal indicative thereof. Preferably, the TPS 41 is a potentiometer. The PWM module 42 receives the throttle position signal from the TPS, and generates a PWM sequence according to the throttle position signal and a desired throttle position signal which is received from an engine control module (ECM). As mentioned, an ECM, also known as engine control unit (ECU) or power-train control module (PCM) is a type of electronic control unit that determines the amount of fuel, ignition timing and other parameters an internal combustion engine needs to operate. The decoder module 46 receives and decodes the throttle position signal from the TPS 41 and generates commutation logic for the BLDC motor 44. The motor controller 43, being connected to the PWM module 42 and the decoder module 46, controls the commutation of the BLDC motor 44 according to the PWM sequence from the PWM module 42 and the commutation logic from the decoder module 46. The controlled BLDC motor 44 drives the throttle through the gear train 45 and a targeted throttle opening is achieved.

Compared to existing throttle control module that involves a PMDC motor, the throttle control module according to the present invention is more reliable due to the BLDC motor 44 not having any brushes and a commutator. Furthermore, compared to known throttle modules that involve a BLDC motor having Hall sensors, as commutation logic is obtained by means of decoding the throttle position signal rather than signals from Hall sensors, the Hall sensors are not required and the cost of the throttle control module is reduced. The Hall sensor-less throttle control module is simpler, cheaper and more reliable.

Figure 2:
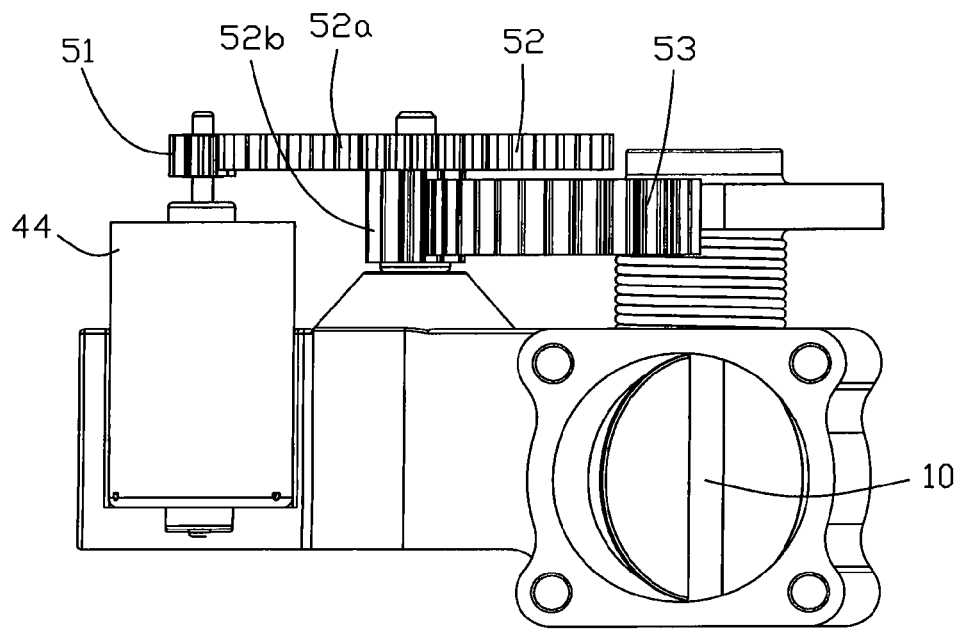
FIG. 2 illustrates a BLDC motor, gear train and throttle, being parts of the block diagram of FIG. 1.

FIG. 2 schematically illustrates the BLDC motor 44, the gear train 45 and the throttle 10. The gear train 45 is a speed reduction gear train, comprising a driving gear 51 fixed onto the shaft of the BLDC motor, a transmission gear 52, a driven gear 53 fixed onto the shaft of the throttle 10. A butterfly valve is fixed to the shaft of the throttle such that rotation of the shaft causes the butterfly valve to rotate, opening or closing the throttle. The transmission gear 52 is a dual gear located between the driving gear 51 and the driven gear 53. More specifically, the dual gear comprises a larger gear 52a and a smaller gear 52b coaxially fixed together, with the larger gear 52a in mesh with the driving gear 51 and the smaller gear 52b in mesh with the driven gear 53. Alternatively, the transmission gear 52 is made as one single-piece dual gear. In the embodiment, radius of the driven gear 53 is larger than that of the driving gear 51.

Figure 3:
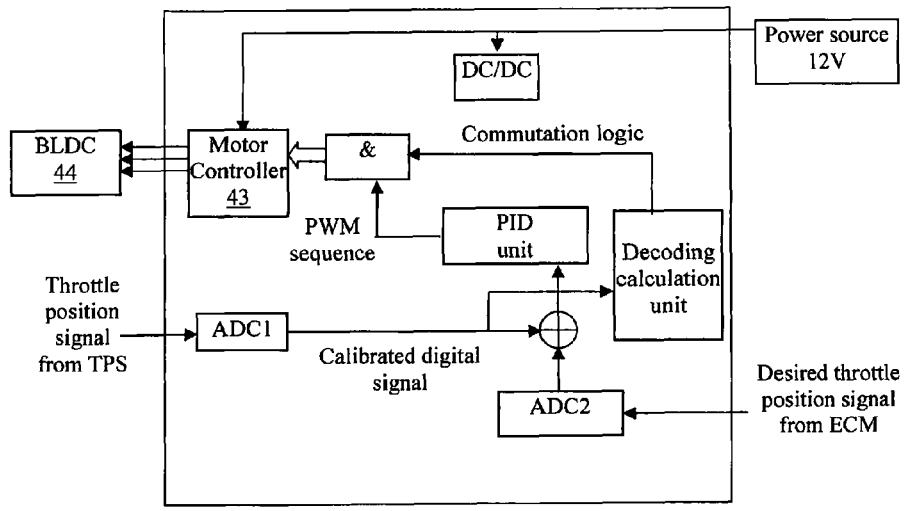
FIG. 3 is a block diagram illustrating a PWM module, a decoder module and a motor control module, being parts of the block diagram of FIG. 1.

FIG. 3 is a block diagram schematically illustrating the PWM module 42, the decoder module 46 and the motor controller 43 of FIG. 1 in greater detail. The PWM module performs proportional-integral-derivative (herein referred as PID) calculation on signals such as throttle position signal and desired throttle position signal and generates a PWM sequence. The decoder module 46 comprises a first analog-digital converter (herein referred as ADC1) and a decoding calculation unit, to generate commutation logic for the BLDC motor. The motor controller 43 controls the BLDC motor according to the PWM sequence and the commutation logic.

Figure 4:
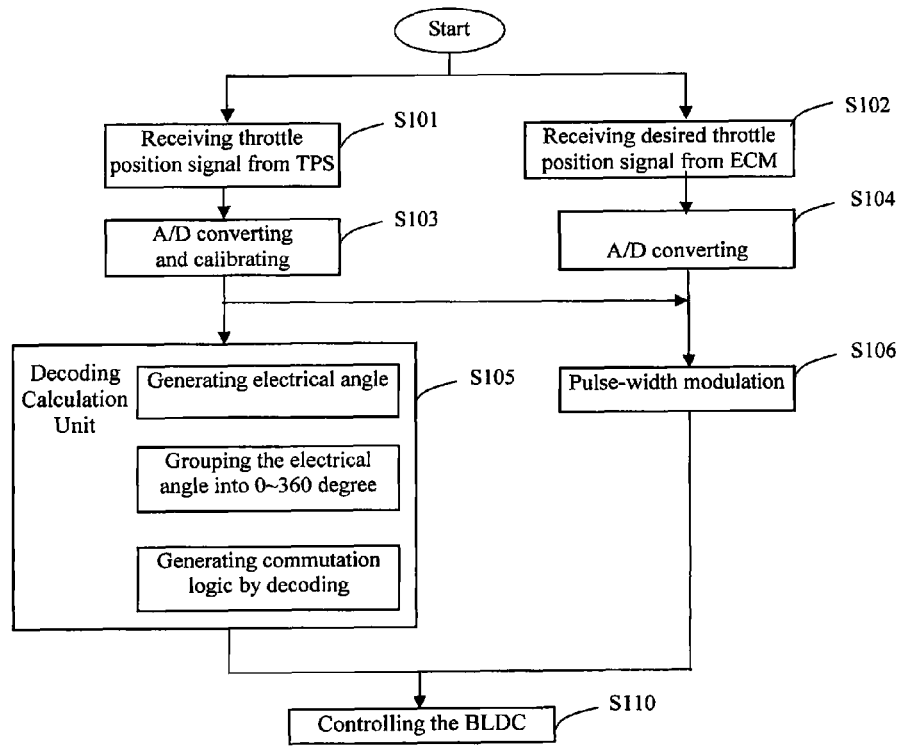
FIG. 4 is a signal flow diagram of throttle control module.

The following describes how the signals are processed and how the PWM sequence and commutation logic are generated. In FIG. 4, there are two processing branches, one comprising steps S101, S103 and S105, the other comprising steps S102, S104 and S106.

In the first processing branch, referring to steps S101 and S103, throttle position signal is received by ADC1 from the TPS. The throttle position signal is converted into digital signal by the ADC1 and then the digital throttle position signal is calibrated. The signal flow then divides into two branches, one followed by step S105, the other followed by step S106. In step S105, the decoding calculation unit performs decoding and calculation on the calibrated signal and generates a signal indicative of an electrical angle which corresponds to the current opening of the throttle, and then commutation logic is generated based on the electrical angle.

In the second processing branch, referring to steps S102 and S104, a desired throttle position signal from the engine control module (herein referred as ECM) is received by a second analog-digital converter (herein referred as ADC2). The desired throttle position signal is converted into a digital desired throttle position signal by the ADC2. In step S106, the PWM module performs HD calculation on the digital desired throttle position signal and the digital calibrated digital throttle position signal which is generated in step S103, and then a PWM sequence is generated. Results from both step S105 and S106 flow into step S110. In step S110, motor controller controls the BLDC motor according to the PWM sequence and the commutation logic.

Figure 5:
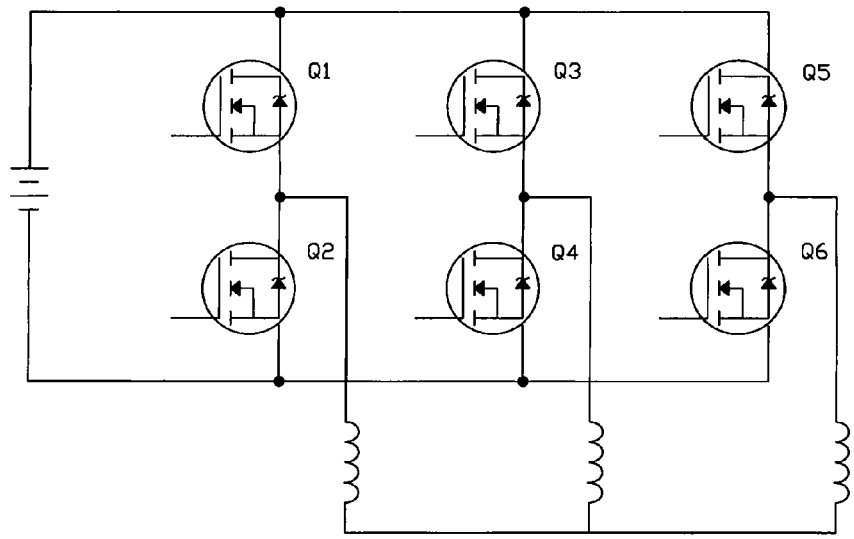
FIG. 5 illustrates a power commutation circuit for a three phase BLDC motor.
Figure 6:
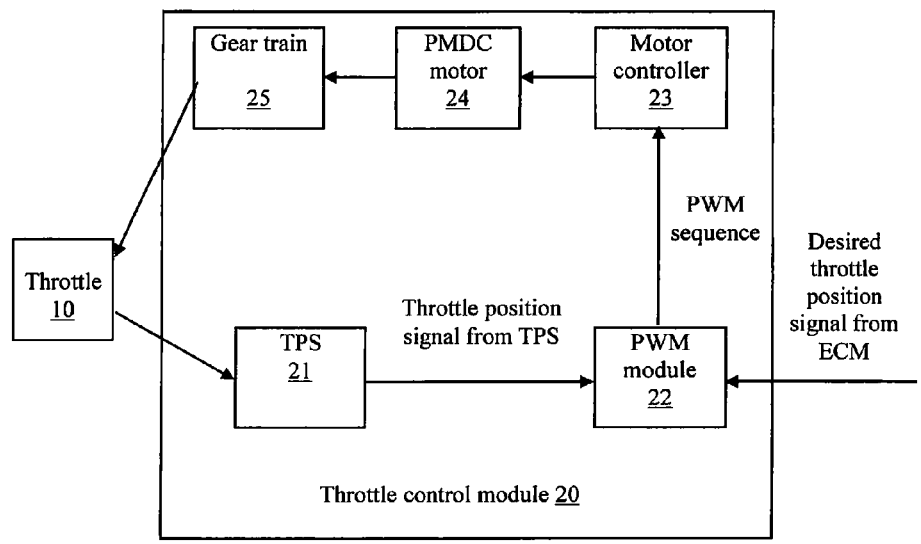
FIG. 6 is a block diagram of a traditional throttle control module implementing a PMDC motor.
Figure 7:
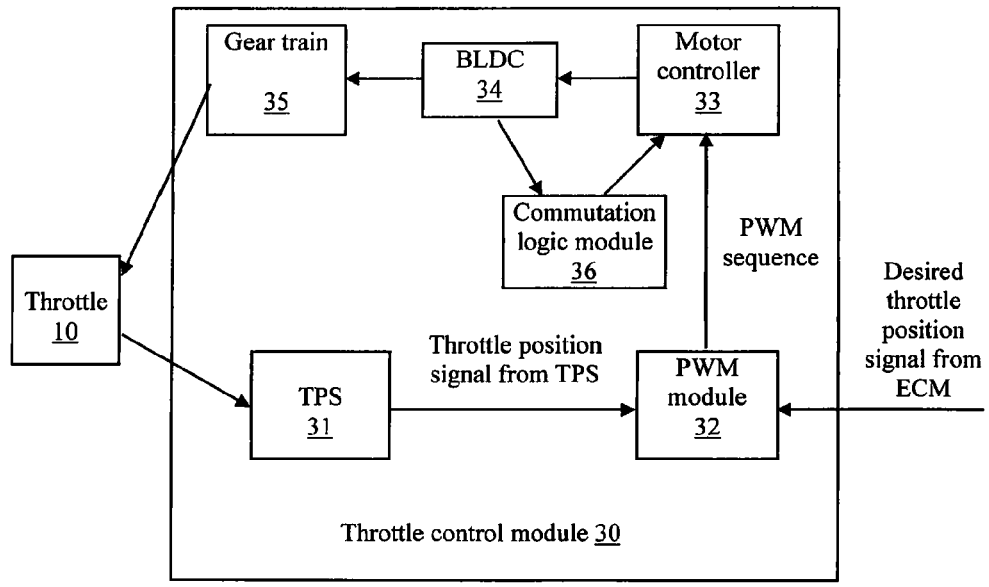
FIG. 7 is a block diagram illustrating a prior art throttle control module using a BLDC motor.
Figure 8:
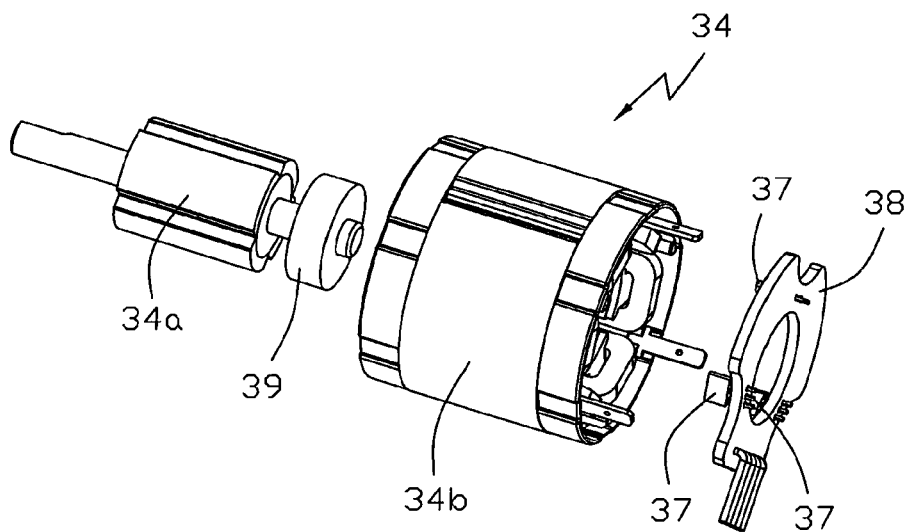
FIG. 8 illustrates a traditional BLDC motor for the prior art ETC module.

FIG. 5 illustrates a commutation circuit for the BLDC motor according to one embodiment of the present invention. The decoder module 46 performs a calculation based on the equation:

$$G = Rem\left[\left(\frac{X}{2^n} * RANG * m * P\right)/360\right],$$

wherein G represents a rotated electrical angle of a rotor, Rem[ ] represents a function to take the remainder, X represents the calibrated digital throttle position signal, n represents the precision bits of the ADC, RANG represents the maximum angle that the throttle can rotate, m represents the reduction coefficient of the gear train, and P represents the number of pole pairs of the motor rotor.

The decoder module 46 generates the commutation logic for the BLDC motor based on the electrical angle G and the following commutation logic table.

| | G | | | | | |
|---|---|---|---|---|---|---|
| | 0-60 | 60-120 | 120-180 | 180-240 | 240-300 | 300-360 |
| Q1 | on | on | off | off | off | off |
| Q2 | off | off | on | on | off | off |
| Q3 | off | off | off | off | on | on |
| Q4 | off | off | off | on | on | off |
| Q5 | on | off | off | off | off | on |
| Q6 | off | on | on | off | off | off |

Referring to the commutation logic table and FIG. 5, electrical angle G is grouped into 60 degree slots within the range of 0 to 360 degrees. Switches Q1 and Q5 are on when electrical angle G falls into a range of 0 to 60 degrees. Similarly, switches Q1 and Q6 are on when electrical angle G falls into a range of 60 to 120 degrees, switches Q2 and Q6 are on when electrical angle G falls into a range of 120 to 180 degrees, switches Q2 and Q4 are on when electrical angle G fall into a range of 180 to 240 degrees, switches Q3 and Q4 are on when electrical angle G fall into a range of 240 to 300 degrees, and switches Q3 and Q5 are on when electrical angle G fall into a range of 300 to 360 degrees.

Certain embodiments of this invention are particularly suited for use as a control module for controlling a throttle, especially the throttle valve of an internal combustion engine. However, the control module is suited for other quarter-turn throttles such as an exhaust gas recirculation (EGR) valve.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:
1. A throttle control module for controlling a throttle, comprising:
  a brushless direct current motor for moving the throttle, the brushless direct current motor having a permanent magnet rotor, the permanent magnet rotor having a number of pole pairs;
  a gear train having a reduction coefficient and connecting the brushless direct current motor to the throttle;
  a throttle position sensor generating a throttle position signal indicative of the position of the throttle;
  a pulse-width modulation module connected to the throttle position sensor, generating a pulse-width modulation sequence according to the throttle position signal from the throttle position sensor and a desired throttle position signal;
  a decoder module connected to the throttle position sensor, performing decoding calculation on the throttle position signal from the throttle position sensor to generate commutation logic for the brushless direct current motor; and a motor controller connected to the pulse-width modulation module and the decoder module, to control commutation of the brushless direct current motor according to the pulse-width modulation sequence and the commutation logic;

wherein the decoder module comprises:

an analog-digital converter for converting the throttle position signal from the throttle position sensor into a digital throttle position signal and calibrating the digital throttle position signal; and a decoding calculation unit for performing decoding calculation based on the calibrated digital throttle position signal, the conversion precision of the analog-digital converter, the number of pole pairs of the rotor and the reduction coefficient of the gear train to get an electrical angle corresponding to the current position of the throttle, and generating the commutation logic according to the electrical angle; and wherein the decoder module calculates the electrical angle according to the equation:

$$G = Rem\left[\left(\frac{X}{2^n} * RANG * m * P\right) / 360\right],$$

wherein, Rem [ ] represents a function to take the reminder, X represents the calibrated digital throttle position signal, n represents the precision bits of the analog-digital converter, RANG represents the maximum angle that the throttle can rotate, m represents the reduction coefficient of the gear train, and P represents the number of pole pairs of the rotor.

2. The throttle control module of claim 1, wherein the gear train comprises:

a driving gear fixed on an output shaft of the brushless direct current motor;

a driven gear fixed on an input shaft of the throttle, the radius of the driven gear being larger than the radius of the driving gear; and a transmission gear disposed between and in mesh with the driving gear and the driven gear.

3. The throttle control module of claim 2, wherein the transmission gear is a dual tier gear comprising a larger gear and a smaller gear coaxially disposed, the larger gear being in mesh with the driving gear and the smaller gear being in mesh with the driven gear.

4. The throttle control module according of claim 1, wherein the brushless direct current motor is a Hall sensorless motor.

5. A method of controlling a throttle comprising the steps of:

providing a brushless direct current motor connected to the throttle by a reduction gear train, the brushless direct current motor having a permanent magnet rotor having a number of pole pairs;

receiving a throttle position signal from a throttle position sensor;

converting the throttle position signal into a digital throttle position signal;

calibrating the digital throttle position signal;

generating commutation logic for the brushless direct current motor by performing decoding calculation on the calibrated digital position signal;

generating a pulse-width modulation sequence according the calibrated digital position signal and a desired throttle position signal; and controlling commutation of the brushless direct current motor according to the pulse-width modulation sequence and the commutation logic to control the throttle;

wherein the step of generating the commutation logic for the brushless direct current motor comprises:

generating an electrical angle corresponding to the current opening position of the throttle by means of performing decoding calculation on the calibrated digital throttle position signal, the number of precision bits of the analog-digital converter, and the number of pole pairs of the rotor; and generating the commutation logic by means of performing decoding calculation on the electrical angle and;

wherein the electrical angle G is generated according to the equation:

$$G = Rem\left[\left(\frac{X}{2^n} * RANG * m * P\right) / 360\right],$$

wherein, Rem[ ] represents a function to take the remainder, X represents the calibrated digital throttle position signal, n represents the precision bits of the analog-digital converter, RANG represents the maximum angle that the throttle can rotate, m represents the reduction coefficient of the gear train, and P represents the number of pole pairs of the rotor.

6. The method of claim 5, further comprising the steps of providing the gear train with a driving gear fixed on an output shaft of the brushless direct current motor, a driven gear fixed on an input shaft of the throttle, and a dual tier transmission gear in mesh with the driving gear and the driven gear, the radius of the driven gear being larger than radius of the driving gear.

* * * * *